(12) United States Patent
Manning (10) Patent No.: US 6,521,880 B1
(45) Date of Patent: Feb. 18, 2003

(54) IMAGE PROCESSING WITH MODIFIED RAMP SIGNAL

(75) Inventor: Paul A Manning, Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/623,800

(22) PCT Filed: Mar. 24, 1999

(86) PCT No.: PCT/GB99/00928

§ 371 (c)(1),
(2), (4) Date: Sep. 8, 2000

(87) PCT Pub. No.: WO99/51024

PCT Pub. Date: Oct. 7, 1999

(30) Foreign Application Priority Data

Mar. 28, 1998 (GB) .............................. 9806611

(51) Int. Cl.⁷ .............................................. H01L 27/00
(52) U.S. Cl. ............................... 250/208.1; 250/214 R; 348/296
(58) Field of Search ............................... 250/208.1, 332, 250/338.1, 227.21, 330, 338.3, 340, 338.4, 391, 214.5; 348/164–8, 296, 222.1

(56) References Cited

U.S. PATENT DOCUMENTS 5,120,950 A * 6/1992 Roziere et al. .......... 250/208.1
5,168,528 A    12/1992 Field, Jr.
5,432,348 A *  7/1995 Dautriche ................. 250/330
6,108,611 A *  8/2000 McEwen .................... 702/90

FOREIGN PATENT DOCUMENTS

| EP | 0 605 282 A | 7/1994 |
| GB | 2 195 855 A | 4/1988 |
| GB | 2 296 147 A | 6/1996 |

* cited by examiner

Primary Examiner—Robert H. Kim
Assistant Examiner—Chih-Cheng Glen Kao
(74) Attorney, Agent, or Firm—Nixon & Vanderhye P.C.

(57) ABSTRACT

An imager is disclosed comprising: one or more detectors, a shutter adapted to open and close periodically to modulate the radiation incident upon the detector element to produce a sequence of alternating open fields and closed fields, said detector being adapted to produce a first pair of output signals $V_{o1}$ and $V_{c1}$ comprising an open field and a closed field, and a second pair of output signals $V_{o2}$ and $V_{c2}$ comprising an open and a closed field, a reset device adapted to reset the output of the detecting element to a predetermined voltage after the output signals of $V_{o1}$, $V_{c1}$, $V_{o2}$ and $V_{c2}$ have all been obtained, there being no reset of the output of the detecting element between the output signals $V_{o1}$, $V_{c1}$, $V_{o2}$ and $V_{c2}$, and a processor adapted to process said first and second pairs of output signals to produce a first and a second processed image signal from the detecting element, the first processed image signal corresponding to the first pair of fields and the second processed image signal corresponding to the second pair of fields. The four signals provide sufficient information to produce images,which are free from reset KTC noise whilst removing the effects of ramp voltages produced by current leakage across the detectors.

13 Claims, 6 Drawing Sheets

IMAGE PROCESSING WITH MODIFIED RAMP SIGNAL

BACKGROUND OF THE INVENTION

1. Field of the Invention

This invention relates to improvements in image processing techniques, and in particular to an improved method of producing an image from an array of detectors, and to apparatus arranged to perform the processing. It is particularly, but not exclusively, applicable to the field of uncooled thermal imaging.

2. Discussion of Prior Art

Many types of detector are known which are sensitive to incident radiation such as infra-red light. Typically, these detectors comprise a sensing element which produces an electrical output signal dependent upon the flux of the radiation incident upon the sensing element. By constructing an array of such detectors, and providing suitable focusing lenses, a two dimensional image of a scene can be produced. In its simplest form, each detector in an array produces an output signal dependent upon the amplitude of incident radiation which is amplified and used to drive a pixel in a VDU, television screen or monitor.

One well known detector array is known as a pyroelectric array. Each detector element in the array comprises a capacitive element. An output current is produced by the capacitive element due to incident radiation, which is amplified through a single stage amplifier. The density in which the detectors are packaged and the requirement for a separate amplifier for each detector element places severe restrictions on the complexity of the electronic processing associated with each detector in order to locate each amplifier adjacent each detector in the array.

A problem with the construction of such arrays arises because the gain of each detector/amplifier combination will be different due to manufacturing tolerances. Thus, if the output image was simply produced by feeding the output of the detectors straight to the pixels of a monitor, the image would be highly noisy. To overcome this problem, and to increase significantly the dynamic range of the system, each of the detectors in the array can be modulated using a rotating modulator (or shutter). The shutter typically (but not necessarily) has equal duration open and closed fields, the output of each of the detectors of the array being interrogated at the end of each field. Pairs of outputs from the array corresponding to an open/closed action of the shutter are processed together to remove signals common to both the open and closed fields, leaving only the information due to the difference in radiation flux on the detectors between the open/closed fields. This technique of using a shutter is known as two point image difference processing (2-point IDP), as the detector outputs are processed in pairs. The use of a shutter is effective in eliminating offsets between detectors and enhancing the dynamic range.

A further problem arises when the choice of detector requires the use of a bias voltage applied across the detector. A well known example is the use of a dielectric bolometer instead of a pyroelectric device. In order for the bolometer to work, a bias voltage must be applied to each detector. The bias voltage causes a current to flow through the parasitic resistance associated with the detector, resulting in a steady ramped increase in the output voltage from the detector. If the voltage ramp is left unchecked it may eventually destroy the amplifier, and at the least would reduce the dynamic range of the device. Current may also flow onto the detector capacitance due to imperfections in the readout IC to which the detector is connected.

To prevent the leakage voltage saturating the amplifier, it is known to reset the output of the detector to ground (or some other reference voltage) by the use of a reset switch after each close/open or open/close cycle of the shutter i.e. after obtaining each output pair. A pair of outputs, obtained between resets is referred to hereinafter as a reset output pair. On each reset the output returns to a chosen voltage, but due to $\sqrt{kTC}$ noise (Johnson noise), the level of the voltage to which the output of the detector is reset cannot accurately be determined. This noise, which causes errors between each reset output pair, would cause noise in the image if any form of IDP is performed which overlaps one or more of the resets. If a ramp due to leakage is present, it is indistinguishable from a radiometric signal, and this causes noise in the images.

The error due to the ramp can be overcome using a technique known as 3-point image difference processing (3-point IDP). In this technique, reset again occurs after each open/close output pair, but instead of processing pairs of outputs, overlapping output triplets are subtracted, each triplet sharing a closed field output with the adjacent triplet. The 3-point technique removes the ramp voltage, but cannot remove the kTC noise, as the reset occurs within each triplet of outputs, and so the correlation between the outputs present in two point IDP is lost.

SUMMARY OF THE INVENTION

An object of the present invention is to provide an improved imager and method of image processing which can alleviate the problems associated with 2-point and 3-point IDP techniques.

In accordance with one aspect, the invention provides an imager comprising: one or more detector means comprising a detecting element adapted to produce an output current dependent upon the incident flux when biased by a bias voltage, shutter means adapted to open and close periodically to modulate the radiation incident upon the detecting element to produce a sequence of alternating open fields in which radiation is incident upon the detecting element and closed fields in which the radiation is at least partially blocked from reaching the detecting element, said detecting element being adapted to produce at least a first open output signal $V_{o1}$ indicative of the flux incident upon the detector during a first open field, a first closed output signal $V_{c1}$ indicative of the flux incident upon the detector during a first closed field, a second open output signal $V_{o2}$ indicative of the flux incident upon the detector during a second open field, and a second closed output signal $V_{c2}$ indicative of the output of the detecting element during a second closed field, said first output signals $V_{o1}$ and $V_{c1}$ corresponding to a first pair of fields comprising an open field and a closed field, and said second output signals $V_{o2}$ and $V_{c2}$ corresponding to a second pair comprising an open and a closed field, and reset means adapted to reset the output of the detecting element to a predetermined voltage, characterised in that the reset means is adapted to reset the output after the output signals of $V_{o1}$, $V_{c1}$, $V_{o2}$ and $V_{c2}$ have all been obtained, there being no reset of the output of the detecting element (3) between the output signals $V_{o1}$, $V_{c1}$, $V_{o2}$ and $V_{c2}$, and by further comprising processing means adapted to produce a modified ramp value indicative of any ramp increase in the output signals over time such as due to bias leakage across the detector by processing pairs of closed field output signals $V_{c1}$, $V_{c2}$ obtained between resets, the processing means being further adapted to process said first and second pairs of output signals together with said modified ramp value to produce a first and second processed image signal from the detecting element, the first processed image signal corresponding to the first pair of fields and the second processed image signal to the second pair of fields. Thus, in accordance with the invention, at least two images (produced from four output signals: two open field and two closed) are produced between each reset. From the two pairs of outputs, sufficient information is present for two images to be produced which are substantially independent of reset kTC noise, overcoming the disadvantages of the prior art 3-point technique, whilst substantially removing the effect of the ramp voltage which produces errors when using a standard 2-point IDP technique.

An amplifier means may be associated with each respective detecting element. There may be one amplifier means for all the detecting elements, or one per element. The amplifying means may be adapted to amplify the output of the detecting element corresponding to three, four or more reset output pairs between each reset, although two is the referred number. Preferably, the two pairs of output signals are obtained from four adjacent shutter fields, i.e. an open-closed-open-closed or closed-open-closed-open sequence. The reset may be applied immediately after each four field sequence.

The two (or more) pairs of outputs may be processed using a recursive filter which generates an average ramp value using several pairs of outputs obtained from between n different resets (where n is an integer). The outputs may be processed to produce a voltage ramp value $V_{ramp}$ according to:

$$V_{ramp}(n) = (1-k)(V_{ramp}(n-1)) + k(V_{c2} - V_{c1})$$

where $V_{c2}$ is the second (i.e. later in time) output corresponding to a closed field from a set of reset outputs whilst $V_{c1}$ is the first (i.e. earlier in time) output corresponding to a closed field from the same set of reset outputs, and k is the filter time constant.

The value of k may range from 1/128 to 1/1024, but may be lower or higher. The value of k may be determined by the maximum number of bits of precision in the arithmetic. Values of k which are of the form $1/(2^n)$ where n is an integer are preferred but not essential. It may be between ½ and ½048, or may be any range of values in between these two limits. The value of k may initially be set to a low value on start up to allow a value of $V_{ramp}$ to be obtained quickly and may then be increased to a higher value to increase the effect of the averaging. The value of k may be varied automatically.

Having obtained the value of $V_{ramp}(n)$, the two images may then be obtained by processing the two pairs of outputs according to:

$$V_{o1} - V_{c1} + [V_{ramp}(n)]/2 \text{ and } V_{o2} - V_{c2} + [V_{ramp}(n)]/2.$$

where $V_{o1}$ and $V_{o2}$ are the first and second outputs corresponding to open fields within the $n^{th}$ reset.

Thus, the processing means may be adapted to process each pair of outputs using a two-point IDP technique offset by the ramp value obtained from combining the two pairs of outputs (with the optional filter).

The bias voltage applied to the detector elements may be between 10 and 100 volts, and a field time of 10 milliseconds is preferred for compatibility with a 50 Hz screen refresh on a monitor screen to which the imager may be connected. The screen may form an integral part of the imager.

In an alternative, the reset may be applied after three outputs have been obtained (i.e. after an open-closed-open shutter sequence or a closed-open-closed sequence), with the three outputs being amplified and processed to remove the effect of voltage ramps due to bias voltage. This produces only a single image per reset, and so is not as efficient as the first aspect of the invention, but does eliminate both the voltage ramps and kTC noise normally associated with three-field IDP.

Again, in the alternative scheme, the three measurements per reset may be processed to produce a voltage ramp value, and averaging can be employed over repeated reset fields to improve the accuracy of this voltage ramp value. A recursive filter could also be used.

In accordance with a further aspect, the invention provides a method of processing an image in an imager comprising an array of one or more detector elements and a shutter in which the shutter is adapted to open and close periodically to modulate the radiation incident upon the detector elements to produce a sequence of open fields in which radiation is incident upon the detector element and closed fields in which radiation is at least partially blocked from reaching the detector elements, the method comprising the steps of: producing a plurality of output signals comprising at least a first open output signal $V_{o1}$ indicative of the flux incident upon the detector during a first open field, producing a first closed output signal $V_{c1}$ indicative of the flux incident upon the detector element corresponding to a first closed field, producing a second open output signal $V_{o2}$ indicative of the flux incident upon the detector element corresponding to a second open field, and producing a second closed output signal $V_{c2}$ indicative of the flux incident upon the detector element corresponding to a second closed field, said first output signals $V_{o1}$ and $V_{c1}$ corresponding to a first pair of fields comprising an open field and a closed field, and said second outputs $V_{o2}$ and $V_{c2}$ corresponding to a second pair comprising an open field and a closed field, characterised by the further steps of resetting the output of each detector to a predetermined voltage after said outputs $V_{o1}$, $V_{c1}$, $V_{o1}$ and $V_{c2}$ have all been obtained, there being no reset of the output of the detecting element between the outputs $V_{o1}$, $V_{c1}$, $V_{o2}$ and $V_{c2}$, processing pairs of closed signals $V_{c1}$, $V_{c2}$ obtained between resets to produce a modified ramp value indicative of any ramp increase in the output signals over time such as due to bias leakage across the detector, and processing the first and second pairs of output signals together with the modified ramp value to produce a first and a second processed image signal from the detecting element, the first processed image signal corresponding to the first pair of fields and the second processed image signal to the second pair of fields.

Most preferably, the image difference processing method resets the output of each detector after two pairs of output signals are produced, although three, four or more pairs of output signals could be produced for each reset. The output of the detector may be reset to ground.

A recursive filter may be used.

The image difference processing method may be used with pyroelectric or bolometric devices, or any other detector type which suffers from voltage leakage under bias.

The method may be implemented in software.

BRIEF DESCRIPTION OF THE DRAWINGS

There will now be described, by way of example only, two embodiments of the present invention in which.

DETAILED DISCUSSION OF EMBODIMENTS

Figure 1A:
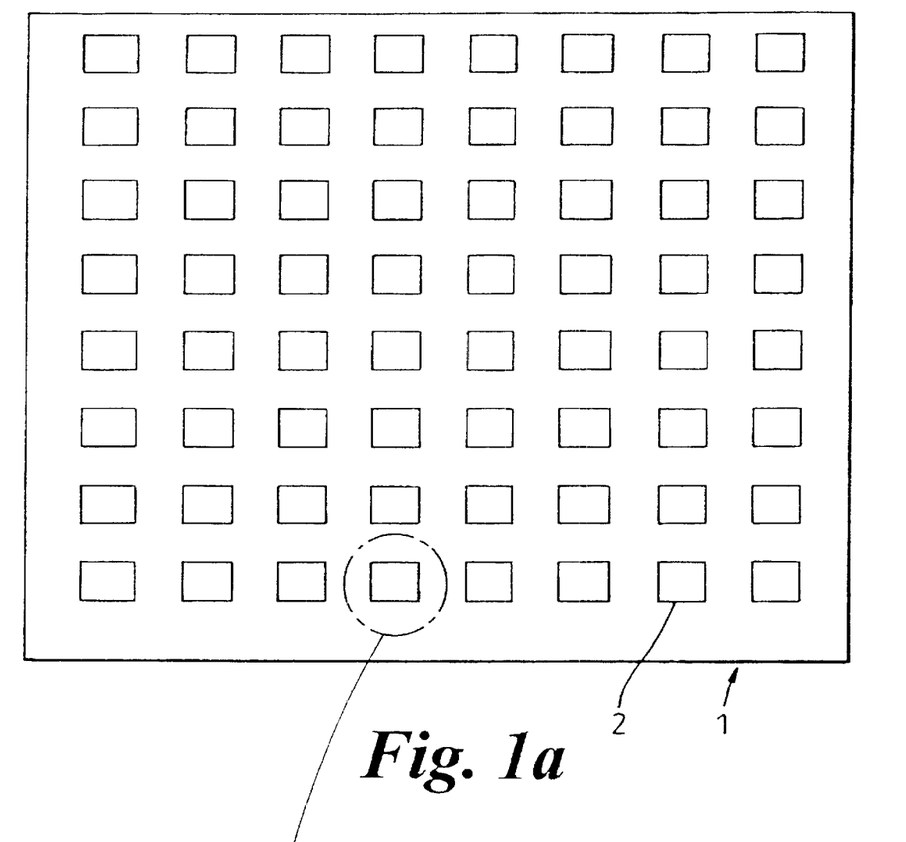
FIG. 1a shows an array of detectors for a thermal imager and a close up of an individual detector and amplifier is shown in FIG. 1b.
Figure 1B:
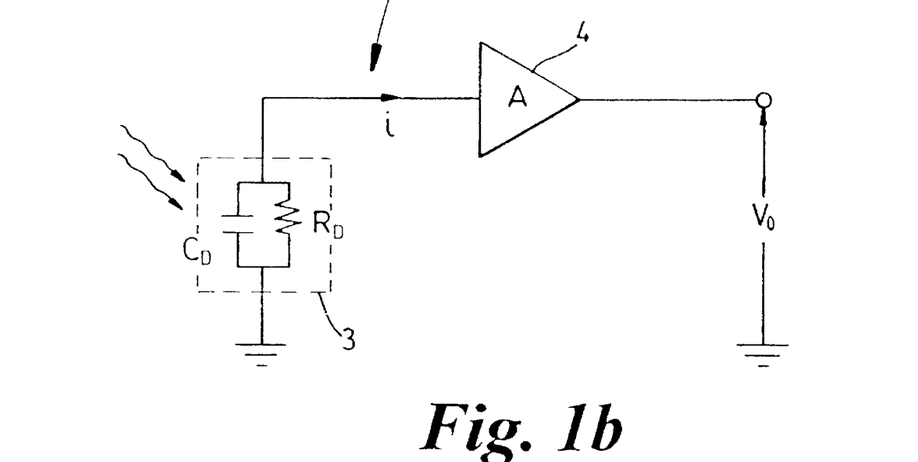

FIG. 1a shows an array 1 of sensors 2 for use in producing an image of the signature of a scene in the thermal (infrared) range. Each sensor 2 of the array comprises an uncooled detector element 3 and an associated amplifier 4 as shown in FIG. 1b. The detector can be represented as a capacitance $C_D$ in parallel with an (undesirable) parasitic resistance $R_D$.

In the case of a pyroelectric array, no bias voltage is applied to the detector element 3, and a current is generated in response to radiation incident upon the detector. This is amplified by the charge amplifier 4 to produce an output voltage.

Figure 3A:
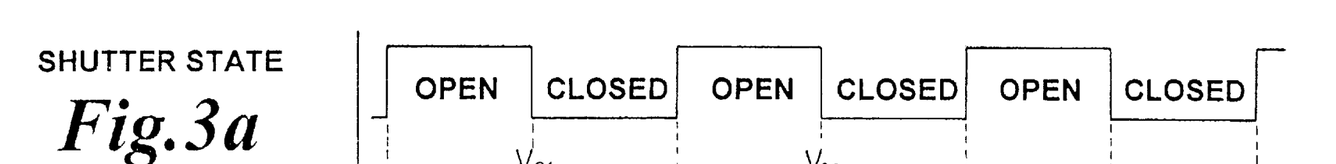
FIG. 3a shows the operating sequence of the chopper modulator.
Figure 3B:
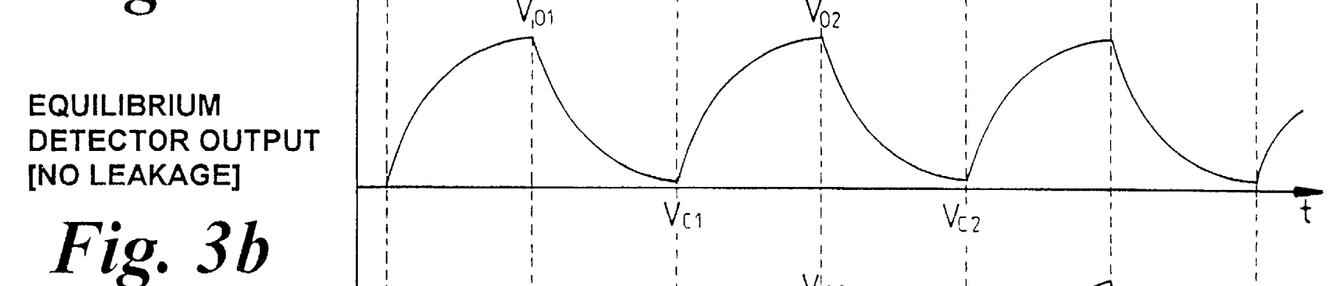
FIG. 3b shows the output voltage from a detector and the measurement points $V_{c1}$, $V_{o2}$, $V_{c2}$.

In order to increase the sensitivity of the array 1, the radiation flux incident upon each detector element 3 is modulated by a shutter (not shown). In its open position, the shutter allows radiation to fall upon a detector. In its closed position, the radiation is either partially or totally prevented from reaching the detector. By comparing the voltage signals output from the amplifier corresponding to an open shutter, $V_{O1}$, and a closed shutter $V_{c1}$, the difference between the two outputs information $V_{O1}-V_{c1}$ provides a measure of the flux of the radiation. The shutter fields and output from the amplifier $V_{c1}$, $V_{o1}$, $V_{c2}$, $V_{o2}$ etc. are shown in FIGS. 3a and 3b respectively. The output voltages from the detectors are preferably sampled towards the end of each shutter cycle when the detector output has substantially stabilised at a steady state value to produce the output signals.

Figure 2:
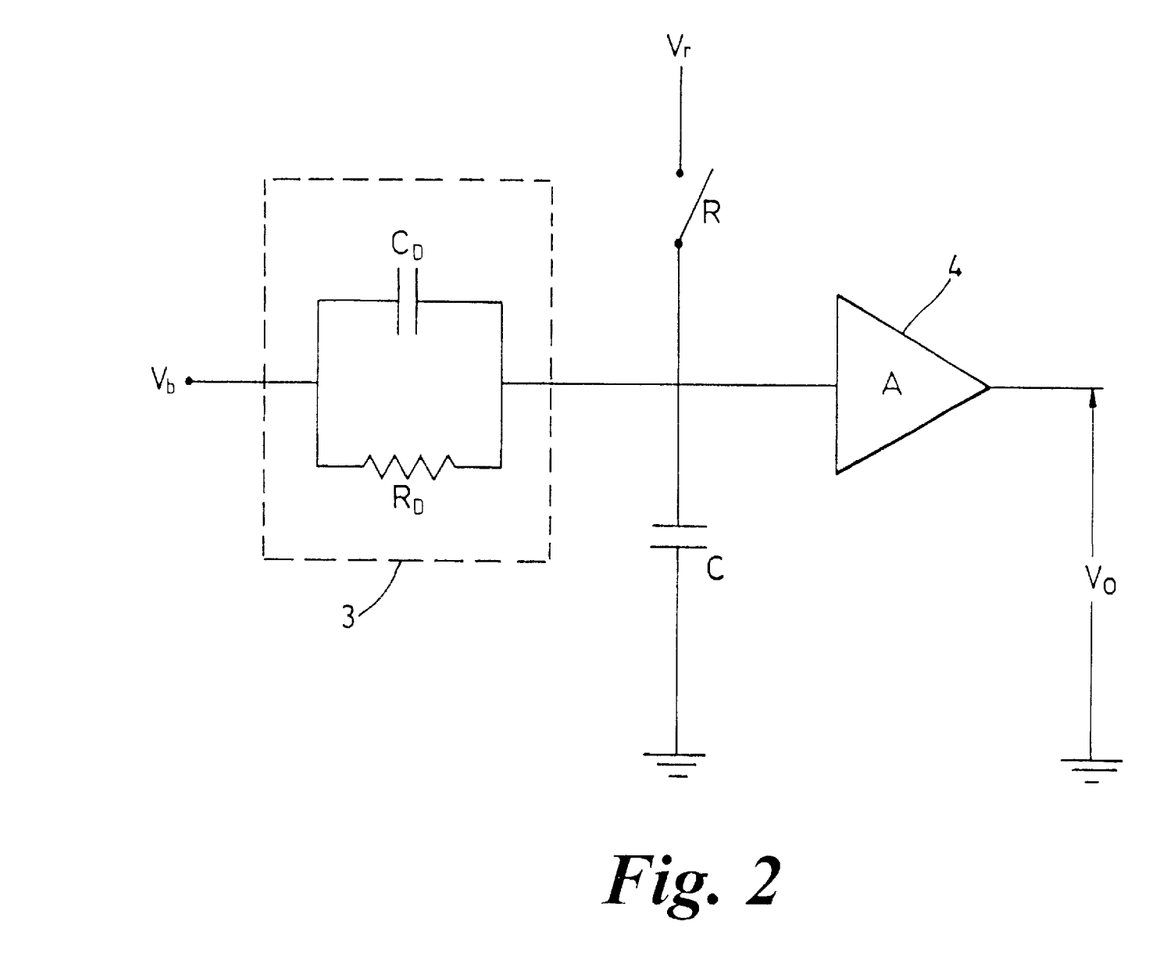
FIG. 2 shows an alternative detector and amplifier in which a bias voltage is applied to the detector and the output of the detector can be reset to a voltage $V_R$.
Figure 3C:
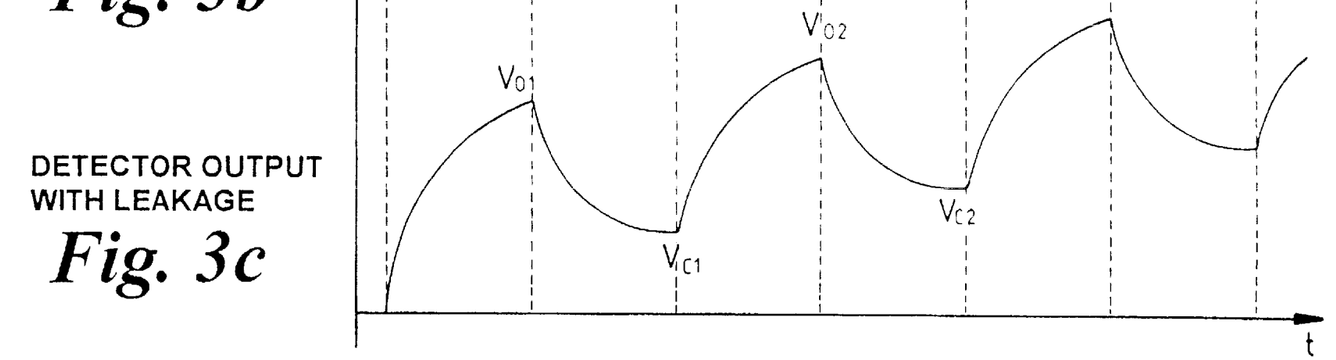
FIG. 3c shows the effect of a ramp voltage due to leakage through the detector on output voltage.

Whilst the above system works satisfactorily in the case of pyroelectric arrays, it is unsuitable for use with bolometric devices. In such devices, a bias voltage must be applied to the detector as shown in FIG. 2. Due to leakage through the detector resistance $R_D$ and thermal drifts, the output voltages is $V_{o1}$, $V_{c1}$, $V_{o2}$ . . . etc. gradually drift up towards the bias voltage over time, producing a steady ramped voltage superimposed onto the desired outputs as shown in FIG. 3c.

The effect of the ramp voltage is twofold. Firstly, the different values for the pairs of outputs $V_{o1}-V_{c1}$, $V_{o2}-V_{c2}$ etc. will be erroneous. Secondly, the drifting increase in output voltage has a detrimental effect on dynamic range and will eventually saturate the amplifier A.

The ramp increase in voltage can be overcome by applying a reset whereby the output of the detector is repeatedly switched to ground following a pair of open/closed outputs. This technique introduces kTC noise which means that pairs of open/closed outputs are no longer correlated and differ by a small amount due to the error introduced by kTC noise. Any accurate comparison between outputs from different pairs would therefore produce an error due to this noise.

Figure 4:
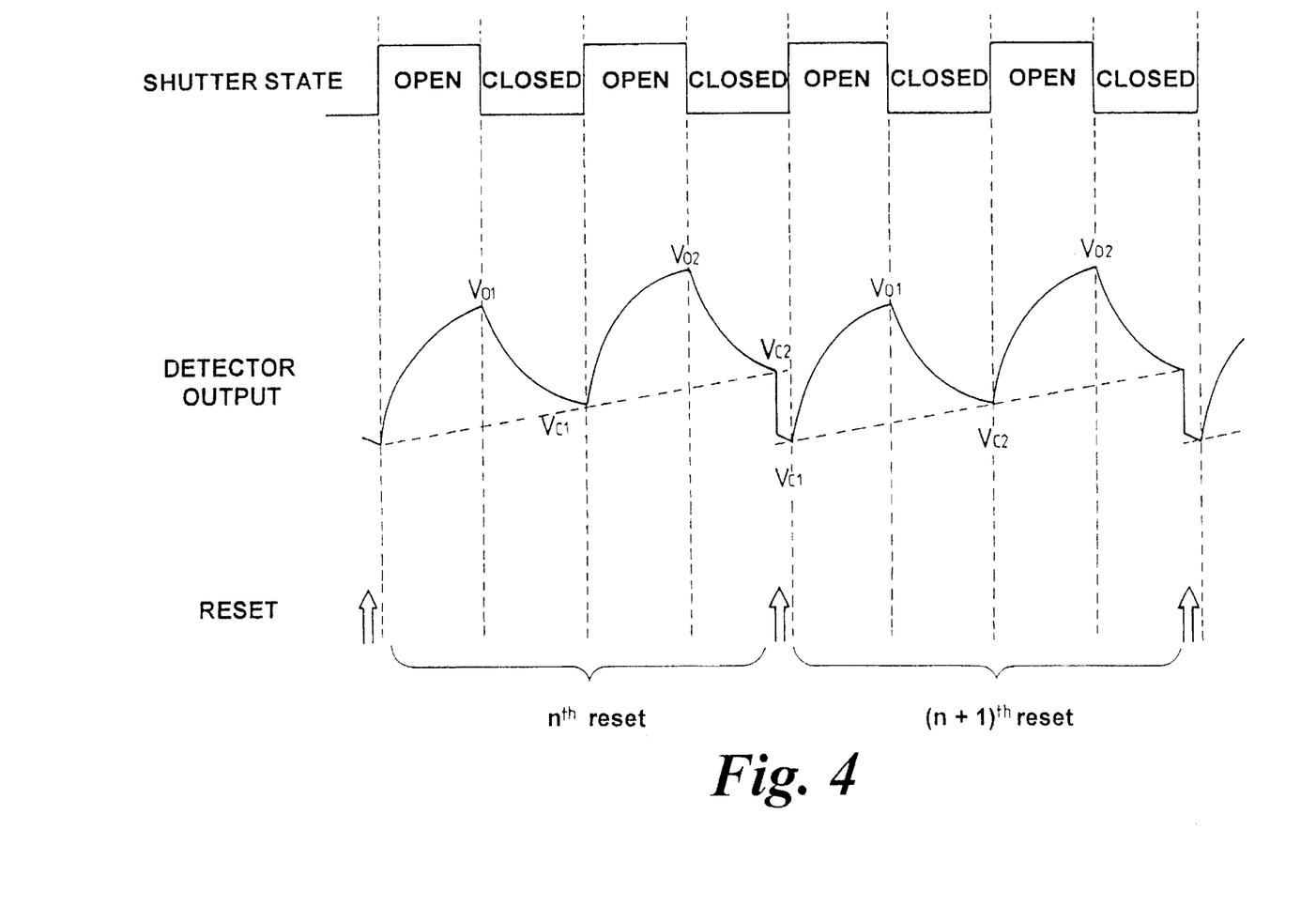
FIG. 4 shows the IDP method of one embodiment in which a reset is applied after any second pair of open/closed fields.

FIG. 4 illustrates the method of one embodiment whereby the detector output is reset after two pairs of open/closed outputs have been measured. The method employs image difference processing techniques whereby the difference between an open and a closed field is measured to enhance dynamic range. Between each reset, the two pairs of correlated open/closed field measurements are denoted by, $V_{c1}$ and $V_{o1}$, for the first pair, and $V_{c2}$ and $V_{o2}$ for the second pair of a closed-open-closed-open shutter sequence.

In the steady state, as shown in FIG. 4 the difference between the first and second closed field outputs $V_{c2}-V_{c1}$ is indicative of the voltage ramp rate due to leakage etc. However, this is not strictly true if the measured signal is continuously changing, so in order to produce a more accurate measurement of ramp rate than simply comparing the adjacent correlated pairs of closed outputs from a single reset, the processing circuit averages out the measured ramp values over a number of resets. For example, a recursive filter can be employed whereby:

$$V_{ramp}(n) = (1-k)V_{ramp}(n-1) + k(V_{c2}-V_{c1}).$$

where k sets the time constant and "weighting" of the recursive filter, and $V_{ramp}(n)$ is the $n_{th}$ set of reset output pairs.

Having calculated the averaged ramp value, a two point IDP calculation can then be used to calculate the image value for each of the two pairs of open/closed outputs within a reset as:

$$V_{o1}-V_{c1}+(V_{ramp}(n)/2) = \text{first image value}.$$

and $$V_{o2}-V_{c2}+(V_{ramp}(n)/2) = \text{second image value}.$$

Thus, this method effectively removes slow changing ramp voltages (due to leakage etc.) whilst retaining fast changing values caused by dynamic effects in the image.

Figure 5:
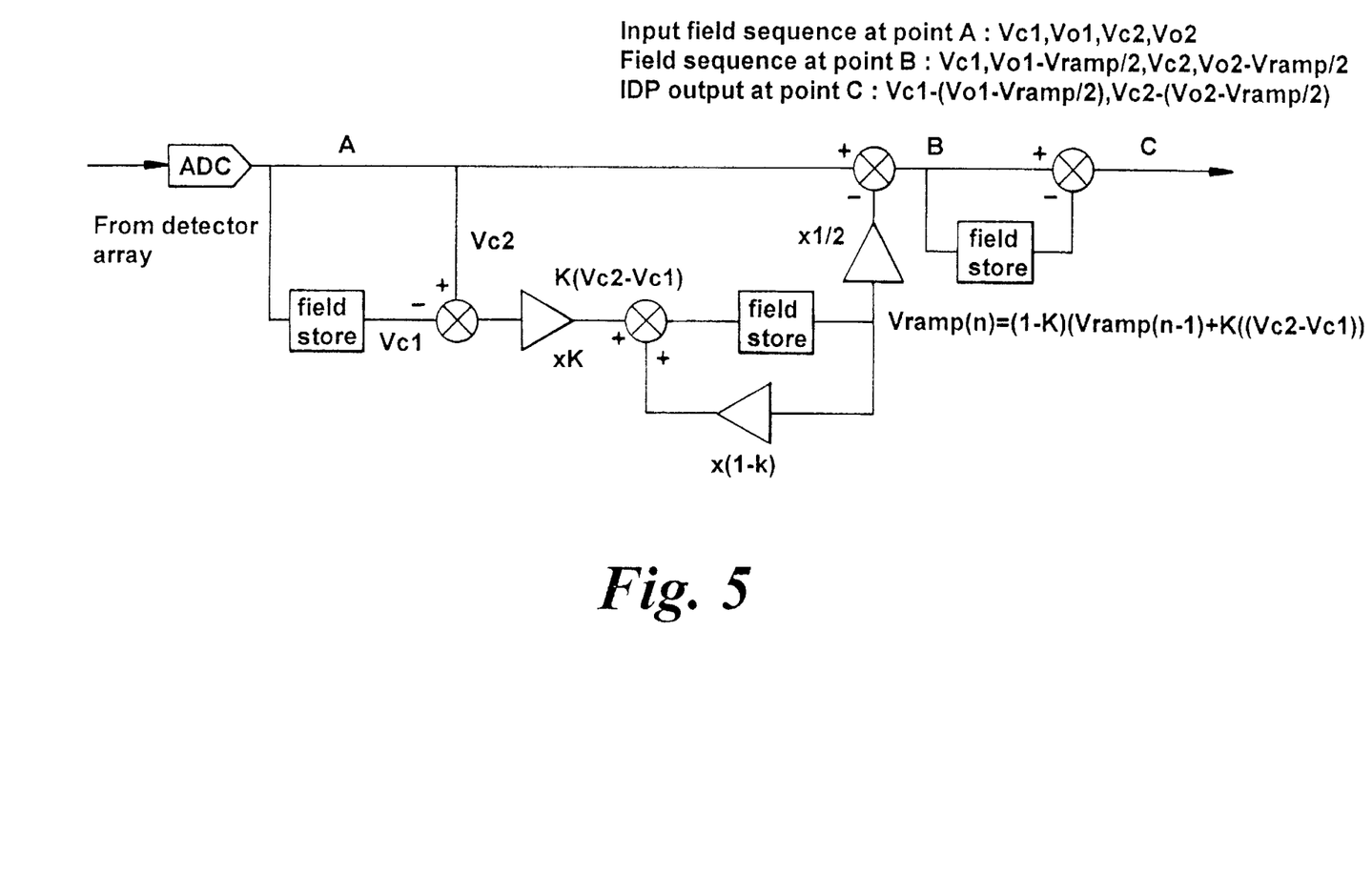
FIG. 5 shows schematically how the proposed IDP method may be implemented in a processor.

A schematic of a suitable processor for performing the IDP scheme is shown in FIG. 5.

Figure 6A:
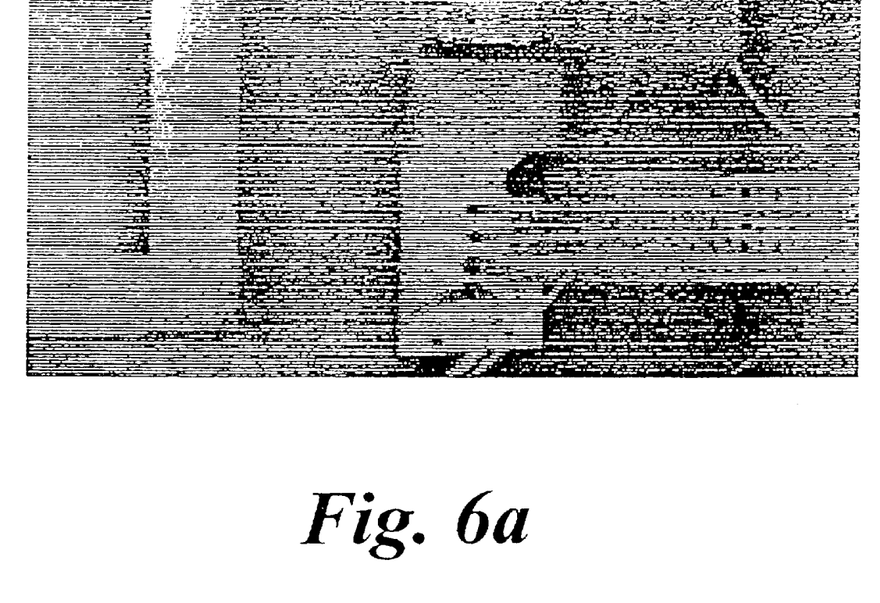
FIG. 6a show a thermal image obtained from a prototype array using the new IDP method.
Figure 6B:
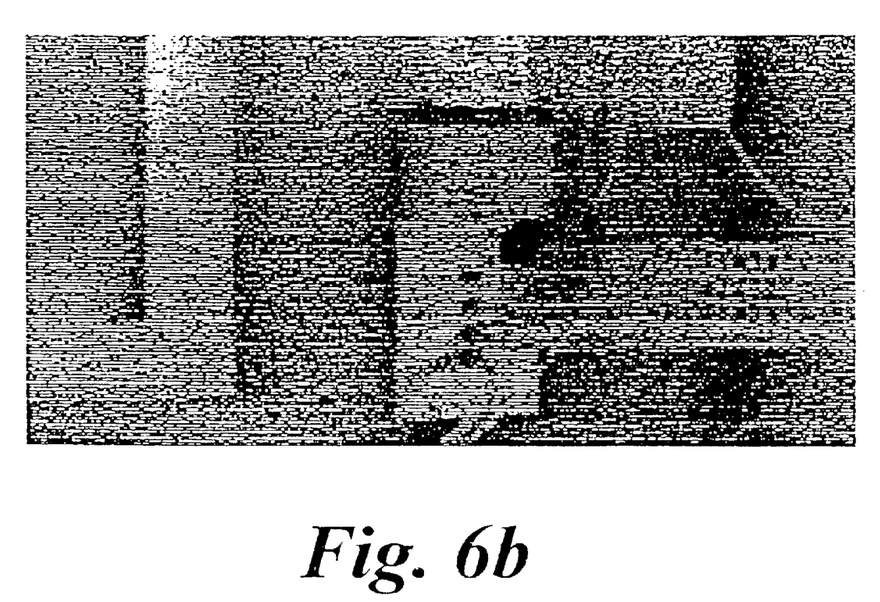
FIG. 6b shows the same image without application of the method.

Performance tests on a prototype system have shown the scheme of the invention to offer considerable performance benefits over the prior art 2-point and 3-point IDP techniques. The prototype employed a 256×128 pixel ferroelectric array as a thermal imager. For compatibility with a standard monitor, with a reset every fourth field as shown in FIG. 4, values of k between 1/128 and 1/1024 were used. This provided a time constant of between 5 and 40 seconds. A comparison of the results obtained from the array both without the scheme of the invention (FIG. 6b) and with the scheme (FIG. 6a) are shown. The image produced using the present scheme is clearly of a higher quality, with the effects of kTC noise substantially eliminated.

What is claimed is:

1. An imager comprising:
    one or more detector means comprising a detecting element to produce an output current dependent upon incident flux when biased by a bias voltage,
    shutter means to open and close periodically to modulate radiation incident upon the detecting element to produce a sequence of alternating open fields in which radiation is incident upon the detecting element and closed fields in which the radiation is at least partially blocked from reaching the detecting element, said detecting element to produce at least a first open output signal $V_{o1}$ indicative of the flux incident upon the detector during a first open field, a first closed output signal $V_{c1}$ indicative of the flux incident upon the detector during a first closed field, a second open output signal $V_{o2}$ indicative of the flux incident upon the detector during a second open field, and a second closed output signal $V_{c2}$ indicative of the output of the detecting element during a second closed field, said first output signals $V_{o1}$ and $V_{c1}$ corresponding to a first pair of fields comprising an open field and a closed field, and said second output signals $V_{o2}$ and $V_{c2}$ corresponding to a second pair comprising an open and a closed field, reset means to reset the output of the detecting element to a predetermined if voltage, wherein the reset means resets the output after the output signals of $V_{o1}$, $V_{c1}$, $V_{o2}$ and $V_{c2}$ have all been obtained, there being no reset of the output of the detecting element between the output signals $V_{o1}$, $V_{c1}$, $V_{o2}$ and $V_{c2}$, and processing means to produce a modified ramp value indicative of any ramp increase in the output signals over time by processing pairs of closed field output signals $V_{c1}$, $V_{c2}$ obtained between resets, the processing means to further process said first and second pairs of output signals together with said modified ramp value to produce a first and second processed image signal from the detecting element, the first processed image signal corresponding to the first pair of fields and the second processed image signal to the second pair of fields.

2. An imager according to claim 1, wherein at least two pairs of output signals are processed to produce the modified ramp value using n different first and second pairs of output signals obtained from n different resets, where n is an integer.

3. An imager according to claim 2 in which a recursive filter is used to generate an average ramp value.

4. An imager according to claim 2 wherein the outputs are processed to produce an average ramp value $V_{ramp}(n)$ according to:

$$V_{ramp}(n)=(1-k)(V_{ramp}(n-1))+k(V_{c2}-V_{c1})$$

where $V_{ramp}(n)$ is the ramp value calculated for the $n^{th}$ reset; the voltage ramp value $V_{ramp}$ being indicative of the increase in the output signals over time due to current leakage through the detector element and k is the filter time constant.

5. An imager according to claim 4 wherein the first and second image signals are obtained by processing the two pairs of output signals according to:

$$V_{o1}-V_{c1}+[(V_{ramp}(n)/2)] \text{ and } V_{o2}-V_{c2}+[(V_{ramp}(n)/2)] \text{ respectively.}$$

6. An imager according to claim 1 wherein there is a plurality of detector means.

7. An imager according to claim 1 wherein an output signal of each of the detecting elements corresponding to only two pairs of open/closed fields is produced between each reset.

8. An imager according to claim 1, wherein the two pairs of output signals are obtained from four adjacent shutter fields.

9. A method of processing an image in an imager comprising an array of one or more detector elements and a shutter in which the shutter is adapted to open and close periodically to modulate radiation incident upon the detector elements to produce a sequence of open fields in which radiation is incident upon the detector element and closed fields in which radiation is at least partially blocked from reaching the detector elements, the method comprising the steps of:

producing a first open output signal $V_{o1}$ indicative of the flux incident upon the detector during a first open field, producing a first closed output signal $V_{c1}$ indicative of the flux incident upon the detector element corresponding to a first closed field, producing a second open output signal $V_{o2}$ indicative of the flux incident upon the detector element corresponding to a second open field, and producing a second closed output signal $V_{c2}$ indicative of the flux incident upon the detector element corresponding to a second closed field, said first output signals $V_{o1}$ and $V_{c1}$ corresponding to a first pair of fields comprising an open field and a closed field, and said second outputs $V_{o2}$ and $V_{c2}$ corresponding to a second pair comprising an open field and a closed field, resetting the output of each detector to a predetermined voltage after said outputs $V_{o1}$, $V_{c1}$, $V_{o1}$ and $V_{c2}$ have all been obtained, there being no reset of the output of the detecting element between the outputs $V_{o1}$, $V_{c1}$, $V_{o2}$ and $V_{c2}$, processing pairs of closed signals $V_{c1}$, $V_{c2}$ obtained between resets to produce a modified ramp value indicative of any ramp increase in the output signals over time, and processing the first and second pairs of output signals together with the modified ramp value to produce a first and a second processed image signal from the detecting element, the first processed image signal corresponding to the first pair of fields and the second processed image signal to the second pair of fields.

10. A method of processing an image according to claim 9 wherein a recursive filter is used.

11. A method of processing an image according to claim 9 wherein the closed field output of a pair is subtracted from the open field output of the same pair to produce an intermediate image signal, and a signal representative of the ramp value is subtracted from the intermediate image signal to produce the image corresponding to that pair of output signals.

12. A method of processing an image according to claim 9 wherein the output of each detector element is reset after more than two pairs of output signals are produced.

13. A method of processing an image according to claim 9 wherein the output is reset substantially to zero volts.

* * * * *